(12) United States Patent
Yahata et al.

(10) Patent No.: US 7,197,868 B2
(45) Date of Patent: Apr. 3, 2007

(54) EXHAUST GAS PURIFICATION SYSTEM OF INTERNAL COMBUSTION ENGINE

(75) Inventors: Shigeto Yahata, Obu (JP); Makoto Saito, Okazaki (JP); Masumi Kinugawa, Okazaki (JP)

(73) Assignee: Denso Corporation, Kariya, Aichi-pref (JP)

( * ) Notice: Subject to any disclaimer, the term of this patent is extended or adjusted under 35 U.S.C. 154(b) by 111 days.

(21) Appl. No.: 10/923,776

(22) Filed: Aug. 24, 2004

(65) Prior Publication Data

US 2005/0044846 A1 Mar. 3, 2005

(30) Foreign Application Priority Data

Aug. 25, 2003 (JP) ............................. 2003-299502
Jul. 28, 2004 (JP) ............................. 2004-219773

(51) Int. Cl.
*F01N 3/00* (2006.01)

(52) U.S. Cl. ............................. 60/297; 60/274; 60/295; 60/311; 55/DIG. 30

(58) Field of Classification Search .................. 60/274, 60/286, 295, 297, 311; 55/DIG. 30
See application file for complete search history.

(56) References Cited

U.S. PATENT DOCUMENTS

| | | | | |
|---|---|---|---|---|
| 5,211,010 A | | 5/1993 | Hirota | |
| 5,287,698 A | * | 2/1994 | Shinzawa et al. | ............. 60/286 |
| 5,941,066 A | * | 8/1999 | Araki et al. | ................... 60/280 |
| 6,253,543 B1 | * | 7/2001 | Russell | ......................... 60/274 |
| 6,622,480 B2 | * | 9/2003 | Tashiro et al. | ................. 60/295 |
| 6,854,265 B2 | * | 2/2005 | Saito et al. | ..................... 60/295 |
| 6,898,930 B2 | * | 5/2005 | Nakatani et al. | .............. 60/311 |
| 6,945,036 B2 | * | 9/2005 | Kato et al. | ..................... 60/297 |
| 2003/0131592 A1 | * | 7/2003 | Saito et al. | .................... 60/295 |

FOREIGN PATENT DOCUMENTS

JP 11037411 A * 2/1999

* cited by examiner

*Primary Examiner*—Tu M. Nguyen
(74) *Attorney, Agent, or Firm*—Nixon & Vanderhye P.C.

(57) ABSTRACT

An electronic control unit estimates progress of growth in a particle diameter of an ash accumulated in a diesel particulate filter (a DPF), based on an operating state of an engine. If it is determined that an estimated particle diameter of the ash achieved through the progress of the growth is greater than a predetermined value, regeneration of the DPF is compulsorily performed even when a quantity of particulate matters accumulated in the DPF is lower than a reference value, at which the DPF should be regenerated. Thus, the particulate matters are eliminated through combustion, and the ashes are discharged from the DPF.

11 Claims, 8 Drawing Sheets

EXHAUST GAS PURIFICATION SYSTEM OF INTERNAL COMBUSTION ENGINE

CROSS REFERENCE TO RELATED APPLICATION

This application is based on and incorporates herein by reference Japanese Patent Applications No. 2003-299502 filed on Aug. 25, 2003 and No. 2004-219773 filed on Jul. 28, 2004.

BACKGROUND OF THE INVENTION

1. Field of the Invention

The present invention relates to an exhaust gas purification system of an internal combustion engine having a particulate filter for collecting particulate matters included in exhaust gas, which is discharged from an exhaust port of the engine. Specifically, the present invention relates to regeneration of the particulate filter.

2. Description of the Related Art

Conventionally, an exhaust gas purification system for reducing air pollutants discharged from an exhaust port of an internal combustion engine is introduced as one of measures for protecting the environment. As an example of the above exhaust gas purification system, a catalyst system employing an oxidation catalyst, a nitrogen oxide catalyst, a three-way catalyst or the like is publicly known. In recent years, particulate matters such as soot or a soluble organic fraction (SOF) included in exhaust gas of a diesel engine have been problems. As one of countermeasures against the particulate matters, an exhaust gas purification system having a particulate filter in an exhaust passage is employed. If the exhaust gas enters the particulate filter, the exhaust gas passes through porous partition walls. At that time, the particulate matters are collected at surfaces or pores of the partition walls. If a quantity of the collected and accumulated particulate matters increases excessively, a fluid resistance in the particulate filter increases and a back pressure of the internal combustion engine increases. As a result, output of the engine will be reduced, for instance. Therefore, the particulate filter is regenerated by combusting and eliminating the accumulated particulate matters regularly.

An exhaust gas purification system disclosed in U.S. Pat. No. 5,211,010 (Patent Document 1) estimates the quantity of the accumulated particulate matters and determines regeneration timing of the particulate filter based on the result of the estimation. The accumulated quantity is calculated from a pressure difference across the particulate filter or a flow rate of the exhaust gas, based on the fact that a pressure loss at the particulate filter is increased by the accumulation of the particulate matters. If the quantity of the accumulated particulate matters exceeds a threshold value, it is determined that regeneration start timing is reached.

Ashes enter the particulate filter with the particulate matters. The ashes are incombustible particles, which are produced mainly through reaction between calcium included in engine oil and sulfur included in fuel. The ashes entering the particulate filter are prone to be collected by the particulate matters.

A particle diameter of the ash ranges from 0.1 micrometer to several micrometers when the ash is produced in a combustion chamber and is sufficiently smaller than an average diameter of the pores of the particulate filter, which ranges from ten micrometers to several tens of micrometers. If the particle diameter of the ash is in the above range (0.1 micrometer to several micrometers), the ash passes through the pores during the regeneration of the particulate filter, in which the particulate matters are combusted and eliminated, and is discharged from the particulate filter. However, the particle diameter of the ash grows while the ash stays within the particulate filter. Therefore, in some growing state of the particle diameter of the ash, the ash becomes less prone to be discharged from the particulate filter even when the particulate filter is regenerated. In this case, there is a possibility that the pressure loss at the particulate filter cannot return to the original level because of the remaining ashes even if the particulate matters are combusted and eliminated.

Even the technology disclosed in Patent Document 1, which combusts and eliminates the accumulated particulate matters regularly, cannot sufficiently prevent the ashes from remaining in the particulate filter. More specifically, if a heavy-load operating condition continues, the particulate matters accumulated in the particulate filter are combusted and eliminated not through the regeneration control because the temperature of the particulate filter becomes high under the heavy-load operating condition. In this case, there is a possibility that the eliminated quantity of the particulate matters is balanced with a quantity of the particulate matters newly entering the particulate filter, so the quantity of the accumulated particulate matters does not increase. In this case, it is not determined that the start timing of the regeneration is reached, so the ashes will stay in the particulate filter for a long time. As a result, the particle diameter of the ash will grow further.

SUMMARY OF THE INVENTION

It is therefore an object of the present invention to provide an exhaust gas purification system of an internal combustion engine capable of appropriately discharging ashes from a particulate filter.

According to an aspect of the present invention, an exhaust gas purification system of an internal combustion engine has a particulate filter disposed in an exhaust passage. The particulate filter collects particulate matters included in exhaust gas and is regenerated by combusting the particulate matters collected and accumulated in the particulate filter. The exhaust gas purification system includes growth estimating means for estimating progress of growth in a particle diameter of an incombustible ash included in the exhaust gas. The exhaust gas purification system further includes regeneration timing determining means for determining that regeneration start timing of the particulate filter is reached if an estimated value of the particle diameter of the ash achieved through the progress of the growth, which is estimated by the growth estimating means, exceeds a predetermined value.

The regeneration of the particulate filter is performed before the growth in the particle diameter of the ash progresses excessively. Therefore, the ashes staying in the particulate filter can be smoothly discharged from the particulate filter to a downstream exhaust passage.

BRIEF DESCRIPTION OF THE DRAWINGS

Features and advantages of embodiments will be appreciated, as well as methods of operation and the function of the related parts, from a study of the following detailed description, the appended claims, and the drawings, all of which form a part of this application. In the drawings:

DETAILED DESCRIPTION OF THE REFERRED EMBODIMENTS (First Embodiment)

Figure 1:
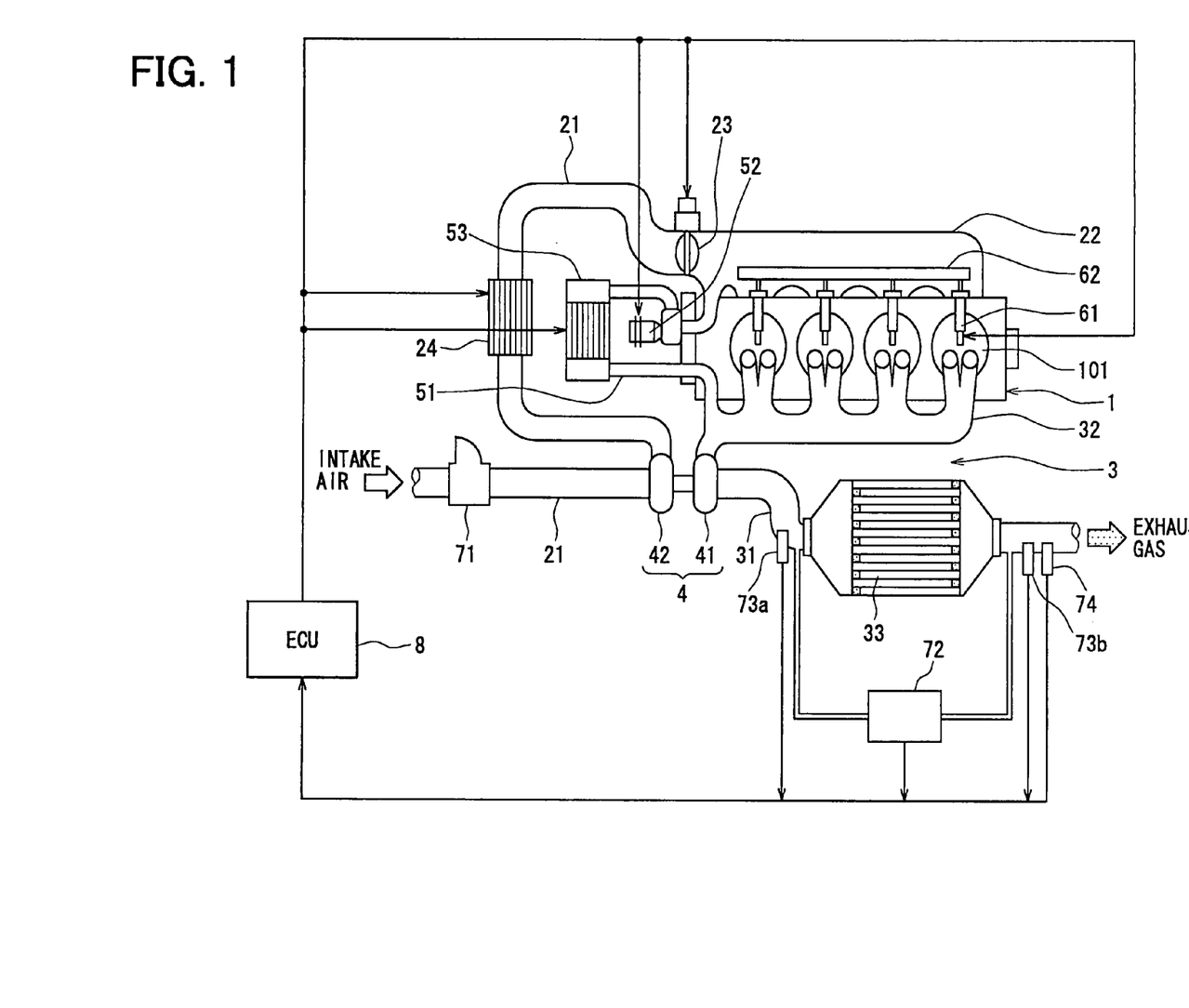
FIG. 1 is a schematic diagram showing an internal combustion engine having an exhaust gas purification system according to a first embodiment of the present invention.

Referring to FIG. 1, a diesel engine system as an internal combustion engine having an exhaust gas purification system according to a first embodiment of the present invention is illustrated.

As shown in FIG. 1, an engine 1 includes a common rail 62, which is common to respective cylinders, and multiple injectors 61, which are connected to the common rail 62 and inject fuel into combustion chambers of the respective cylinders. An intake manifold 22 of the engine 1 is connected to an intake pipe 21. An intake throttle valve 23 disposed at the connection between the intake manifold 22 and the intake pipe 21 regulates a flow rate of intake air. The flow rate of the intake air flowing through the intake pipe 21 is sensed with an air flow meter 71.

Exhaust gas from an exhaust port 101 of the engine 1 is discharged through an exhaust passage 3. The exhaust passage 3 includes an exhaust manifold 32 and an exhaust pipe 31 in that order from the upstream side of the flow of the exhaust gas. A diesel particulate filter (a DPF) 33 having publicly known structure is disposed in the exhaust pipe 31. The DPF 33 is made of heat-resistant ceramics such as cordierite and is formed in the shape of a honeycomb, which has a multiplicity of cells provided by porous partition walls. An inlet or an outlet of each cell is blocked alternately. The exhaust gas enters the cells whose inlets are open. When the exhaust gas passes through the porous partition walls, particulate matters are collected. Inner surfaces of the DPF 33 contacting the exhaust gas may support a catalyst for promoting oxidation of the particulate matters so that the particulate matters can be combusted and eliminated stably in a low-temperature range of the DPF 33.

A turbine 41 of a centrifugal supercharger 4 is disposed upstream of the DPF 33 in the exhaust pipe 31. A compressor 42 is disposed in the intake pipe 21. The turbine 41 is connected with the compressor 42 through a turbine shaft. Thus, the compressor 42 is driven by thermal energy and compresses the intake air, which is introduced into the intake pipe 21, in the compressor 42. A cooler 24 is disposed upstream of the intake throttle valve 23 in the intake pipe 21. The intake air compressed and heated at the compressor 42 is cooled at the cooler 24.

The exhaust manifold 32 is connected with the intake manifold 22 through an exhaust gas recirculation passage (an EGR passage) 51. Thus, part of the exhaust gas is recirculated into the intake air through the EGR passage 51. An EGR valve 52 is disposed at an outlet of the EGR passage 51 communicating with the intake manifold 22. The quantity of the exhaust gas recirculated into the intake air (EGR gas) can be regulated by regulating an opening degree of the EGR valve 52. An EGR cooler 53 for cooling the recirculated EGR gas is disposed in the EGR passage 51.

A pressure difference sensor 72 is connected to the exhaust pipe 31. The pressure difference sensor 72 measures a pressure difference across the DPF 33 in order to estimate a quantity of the particulate matters collected and accumulated in the DPF 33 (a PM accumulation quantity). The pressure difference sensor 72 is connected to a portion of the exhaust pipe 31 upstream of the DPF 33 and to a portion of the exhaust pipe 31 downstream of the DPF 33 through pressure introduction pipes respectively. The pressure difference sensor 72 outputs a signal corresponding to the pressure difference across the DPF 33. Temperature sensors 73a, 73b for sensing temperature of the exhaust gas are disposed at the inlet and the outlet of the DPF 33. Thus, the temperature sensors 73a, 73b sense representative temperature (DPF temperature) of the DPF 33 and the exhaust gas passing through the DPF 33. Averaging process of the temperatures sensed by the two temperature sensors 73a, 73b or various types of filtering processes such as first-order lag filtering can be used in the calculation of the DPF temperature.

An electronic control unit (an ECU) 8 receives output signals from the air flow meter 71, the pressure difference sensor 72, the temperature sensors 73a, 73b and an air-fuel ratio sensor 74, and output signals from various sensors for sensing the opening degree of the EGR valve 52, engine rotation speed, vehicle speed, cooling water temperature, an accelerator position, a crank position, a fuel pressure and the like. Thus, the ECU 8 detects operating states of various parts of the engine 1. The ECU 8 calculates an optimum fuel injection quantity and the optimum EGR quantity (the quantity of the EGR gas) in accordance with the operating state of the engine 1 detected through the output signals of the various sensors. Thus, the ECU 8 feedback-controls the intake throttle valve 23, the injectors 61, the EGR valve 52 and the like.

The ECU 8 calculates the PM accumulation quantity and controls the regeneration of the DPF 33 based on the intake air flow rate sensed by the air flow meter 71 and the pressure difference across the DPF 33 sensed by the pressure difference sensor 72. Generally, the pressure difference increases as the PM accumulation quantity increases with respect to a certain flow rate of the exhaust gas. Therefore, the PM accumulation quantity can be calculated based on this relationship. When the calculated PM accumulation quantity exceeds a predetermined value, the temperature of the DPF 33 is increased to perform the regeneration for combusting and eliminating the particulate matters collected and accumulated in the DPF 33.

As the regenerating means of the DPF 33, specifically, a post-injection is performed or fuel injection timing is retarded when the injector 61 injects the fuel. By retarding the fuel injection timing, the efficiency of the heat cycle is reduced and waste heat is increased. Alternatively, a method of increasing the temperature of the exhaust gas by turning the intake throttle valve 23 in a valve closing direction than usual can be employed.

In the case where the intake throttle valve 23 is turned in the valve closing direction than usual, the quantity of the intake air is reduced and a heat capacity of the gas entering the cylinder is reduced. Thus, the temperature of the exhaust gas is increased.

Figure 2:
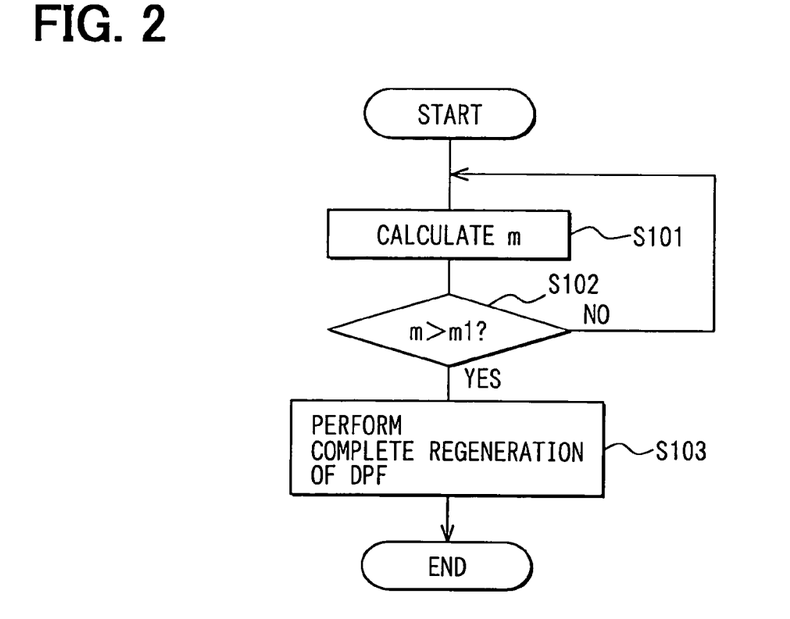
FIG. 2 is a flowchart showing regeneration control of a particulate filter performed by an ECU of the exhaust gas purification system according to the first embodiment.

Next, regeneration control of the DPF 33 of the present embodiment will be explained based on a flowchart shown in FIG. 2. In Step S101, the PM accumulation quantity m is calculated based on a map, which is stored in a memory of the ECU 8 in advance. The pressure difference sensed by the pressure difference sensor 72 increases as the quantity of the particulate matters accumulated in the DPF 33 increases. The sensed value of the pressure difference differs in accordance with the flow rate of the exhaust gas even if the PM accumulation quantity m is the same. Therefore, by obtaining the above relationships through experimentation and the like, a two-dimensional map, in which each PM accumulation quantity m corresponds to the pressure difference and the flow rate of the exhaust gas, is prepared.

Then, in Step S102, it is determined whether the PM accumulation quantity m calculated in Step S101 is greater than a limit PM accumulation quantity m1 as a predetermine reference value. If the result of the determination in Step S102 is "YES", the processing proceeds to Step S103. If the result of the determination in Step S102 is "NO", the processing returns to Step S101. Step S101 for calculating the PM accumulation quantity m is performed in a predetermined cycle, for instance.

In Step S103, complete regeneration of the DPF 33 is performed. More specifically, the post injection is performed until the PM accumulation quantity m becomes zero in Step S103.

Figure 3:
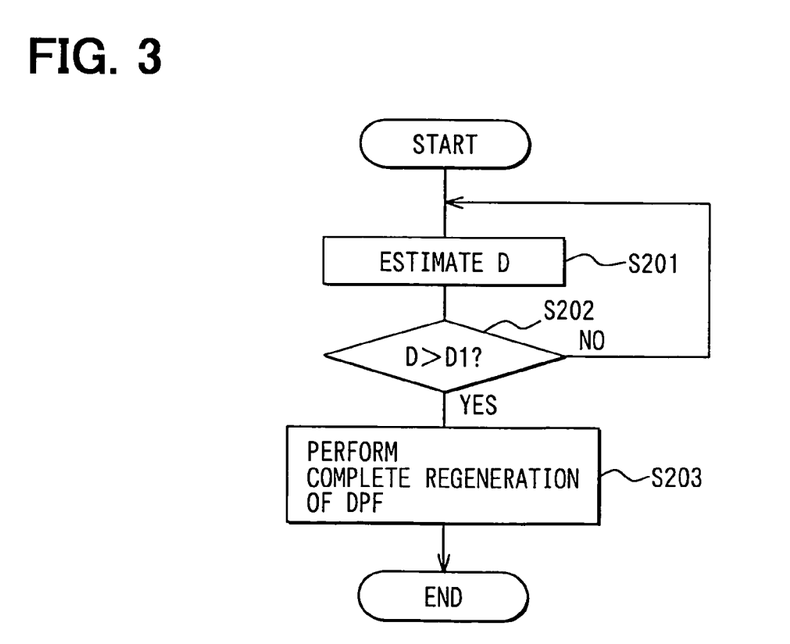
FIG. 3 is a flowchart showing another regeneration control of the particulate filter performed by the ECU of the exhaust gas purification system according to the first embodiment.

The ECU 8 determines regeneration start timing of the DPF 33 based on another control flow shown in FIG. 3. The ECU 8 performs the regeneration control if the ECU 8 determines that the regeneration start timing is reached.

In Step S201 of the flowchart shown in FIG. 3, progress of growth in a particle diameter of the ash is estimated based on the states of the various parts of the engine 1 inputted to the ECU 8. More specifically, the particle diameter of the ash (the ash particle diameter D) achieved through the progress of the growth is estimated based on the states of the various parts of the engine 1 in Step S201.

Then, in Step S202, it is determined whether the ashes remain in the DPF 33 or not based on the estimated progress of the growth in the ash particle diameter. It is determined that there is a possibility that the ashes remain in the DPF 33 if the estimated ash particle diameter D exceeds a predetermined value D1.

If there is no possibility that the ashes remain in the DPF 33 and the result of the determination in Step S202 is "NO", the processing returns to Step S201, and the progress of the growth in the ash particle diameter is continuously monitored.

If the estimated ash particle diameter D is greater than the predetermined value D1 and it is determined that there is a possibility that the ashes remain in the DPF 33, the processing proceeds from Step S202 to Step S203 and the complete regeneration of the DPF 33 is performed. The complete regeneration of the DPF 33 is performed through the post injection and the like, as in the case of the complete regeneration of the DPF 33 performed when the PM accumulation quantity m exceeds the limit PM accumulation quantity m1.

Figure 4A:
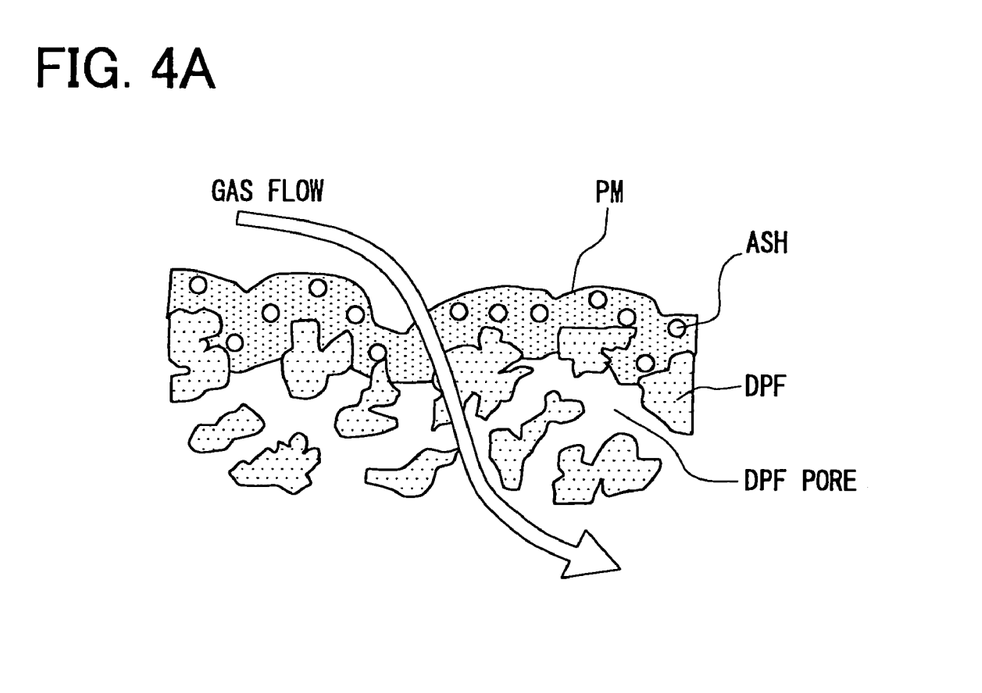
FIG. 4A is a sectional view showing a partition wall of the particulate filter in a state in which particulate matters accumulate on the particulate filter.

FIG. 4A is a schematic diagram showing a state in which the ashes are trapped by the particulate matters (PM) accumulated in the DPF 33. As shown in FIG. 4A, the ashes cannot move with the flow of the exhaust gas, so the ashes stay in the DPF 33. In some operating state of the engine 1, the temperature of the exhaust gas entering the DPF 33 increases to a considerable extent. In this case, if the particulate matters accumulated in the DPF 33 are exposed to the high-temperature exhaust gas, the particulate matters are combusted and eliminated not through the regeneration control performing the post injection and the like. Therefore, there is a possibility that the quantity of the combusted and eliminated particulate matters is balanced with the quantity of the particulate matters, which newly enter the DPF 33 and are accumulated in the DPF 33, and the quantity of the accumulated particulate matters remains substantially constant. As a result, in the conventional exhaust gas purification system, which determines the regeneration start timing of the DPF 33 based on the PM accumulation quantity alone, time length between the end of the regeneration of the DPF 33 and the start of the next regeneration of the DPF 33 is lengthened.

Figure 5:
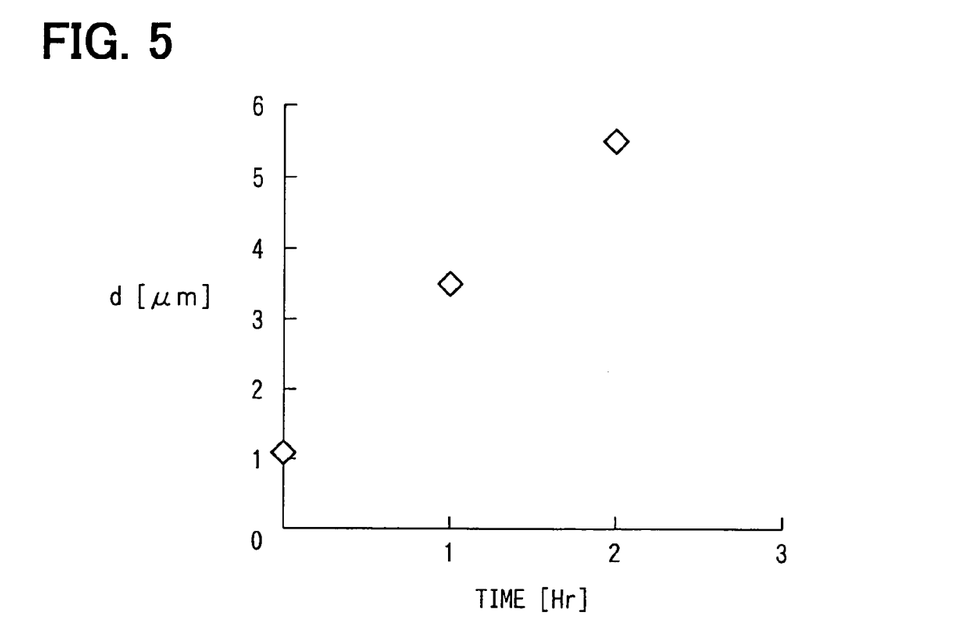
FIG. 5 is a graph showing a relationship between a particle diameter of calcium sulfate and time length of calcination.

A result of a microscopic observation of calcium sulfate ($CaSO_4$), which is a main component of the ash, is shown in a graph of FIG. 5. Powdery specimen of the calcium sulfate is calcined at 800° C. in an electric furnace, and the particle diameter of the calcined calcium sulfate is examined under the microscope. The graph in FIG. 5 shows a relationship between the particle diameter d (micrometer) of the calcium sulfate and time length of the calcination (hour). As shown in FIG. 5, the particle diameter d of the calcium sulfate, which is one micrometer before the calcination, grows in accordance with the time length of the calcination. Therefore, if the time length between the end of the regeneration of the DPF 33 and the start of the next regeneration of the DPF 33 is lengthened, the growth in the particle diameter of the ash in the DPF 33 exposed to the high-temperature exhaust gas can progress to a considerable extent by the time when the next regeneration is started.

Figure 4B:
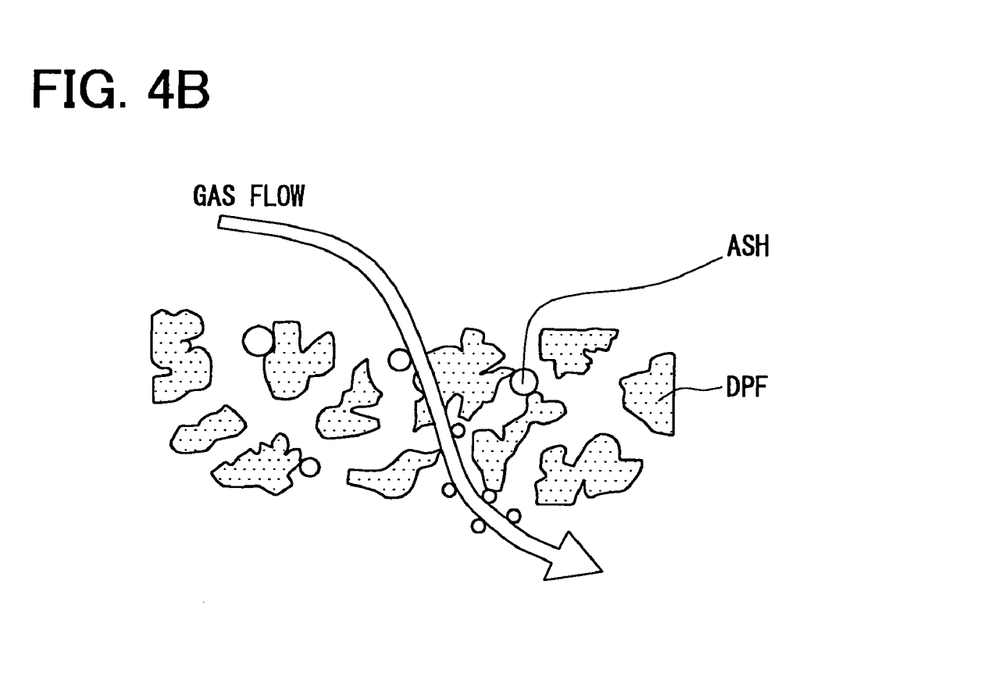
FIG. 4B is a sectional view showing the partition wall of the particulate filter in a state in which the particulate matters are eliminated through combustion.

In contrast, in the exhaust gas purification system of the present embodiment, even if the estimated PM accumulation quantity m does not exceed the value m1 at which the regeneration is started, the ECU 8 determines that the regeneration start timing of the DPF 33 is reached if the growth in the ash particle diameter progresses to a considerable extent and the estimated ash particle diameter D exceeds the predetermined value D1. The predetermined value D1 is determined in consideration of an upper limit of the ash particle diameter, below which the ash particle can easily pass through the pores of the partition wall of the DPF 33. FIG. 4B is a schematic diagram showing a state after the complete regeneration of the DPF 33 is finished. As shown in FIG. 4B, the particulate matters are combusted and eliminated. As explained above, after the regeneration of the DPF 33 is finished, the determination in Step S202 is affirmatively determined before the growth in the ash particle diameter progresses to the extent that the ashes remain in the DPF 33. Therefore, the ashes move with the flow of the gas and are discharged from the DPF 33 as shown in FIG. 4B.

Thus, the complete regeneration of the DPF 33 is performed before the growth in the ash particle diameter progresses excessively. Therefore, for instance, troubles in which the ashes remain in the DPF 33 and cannot pass through the pores of the partition walls can be prevented.

In some operating state of the engine 1, there is a possibility that the growth in the ash particle diameter is hindered but the accumulation of the particulate matters is promoted. However, in the present embodiment, the regeneration start timing of the DPF 33 is determined not only based on the progress of the growth in the ash particle diameter but also based on the PM accumulation quantity. Therefore, the increase in the back pressure of the engine 1 due to the excessive accumulation of the particulate matters or damage to the DPF 33 due to rapid combustion of the collected particulate matters can be prevented.

(Second Embodiment)

Next, an exhaust gas purification system according to a second embodiment of the present invention will be explained. The exhaust gas purification system of the second embodiment has the same basic structure as the first embodiment, but control performed by the ECU 8 in the determination of the regeneration start timing based on the progress of the growth in the ash particle diameter is different from the first embodiment.

Figure 6:
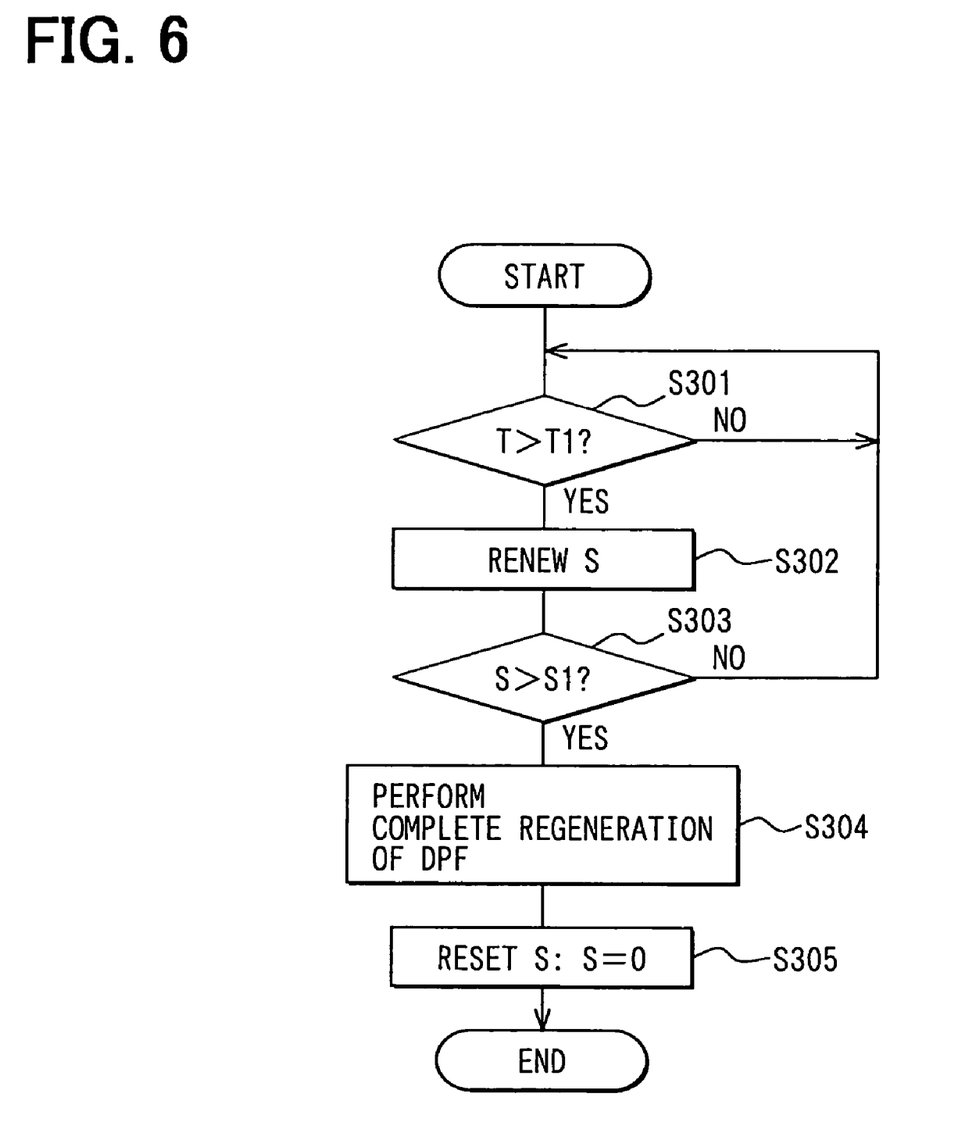
FIG. 6 is a flowchart showing regeneration control of a particulate filter performed by an ECU of an exhaust gas purification system according to a second embodiment of the present invention.

The regeneration control performed by the ECU 8 of the exhaust gas purification system of the second embodiment will be explained based on a flowchart shown in FIG. 6.

Figure 7:
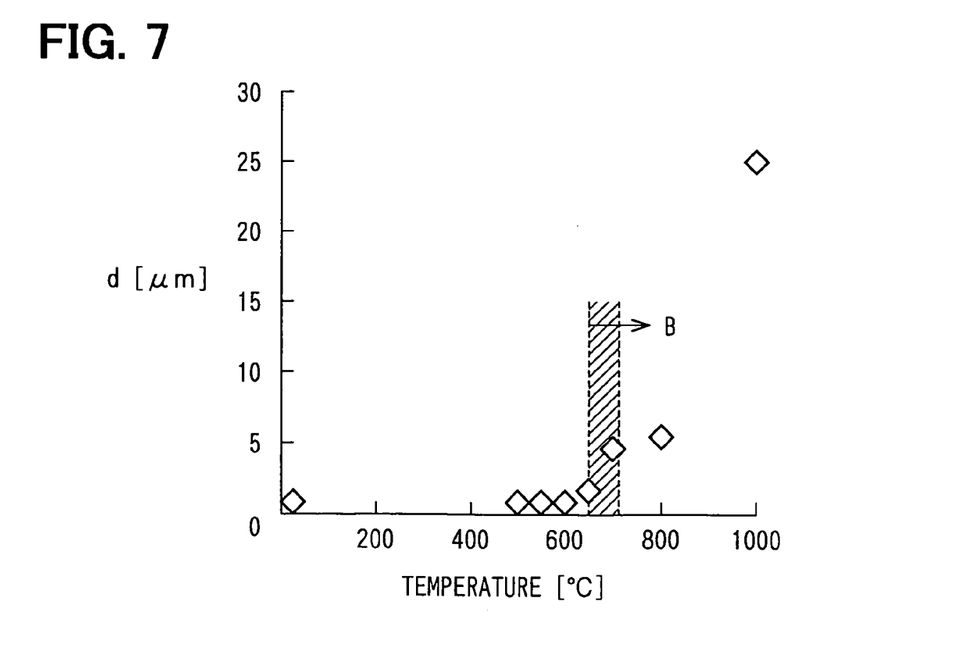
FIG. 7 is a graph showing a relationship between the particle diameter of the calcium sulfate and temperature of the calcination.

First, in Step S301, it is determined whether the DPF temperature T is higher than particle diameter growth start temperature T1. The particle diameter growth start temperature T1 is a predetermined reference temperature, at which the growth in the ash particle diameter starts. The growth in the ash particle diameter is caused by aggregation of the ash particles, but the aggregation is not caused if the temperature is lower than certain temperature. Therefore, the particle diameter growth start temperature T1 exists. The particle diameter growth start temperature T1 is obtained through experimentation and the like in advance. A result of a microscopic observation of the particle diameter of the calcium sulfate, which is the main component of the ash, is shown in a graph of FIG. 7. The powdery specimen of the calcium sulfate is calcined in the electric furnace, and the particle diameter d of the calcium sulfate is observed under the microscope after calcination is performed for two hours. A relationship between the particle diameter d of the calcium sulfate and the temperature of the calcination is shown in the graph of FIG. 7. The diameter of the calcium sulfate before the calcination is one micrometer. As shown in FIG. 7, the growth in the particle diameter d is accelerated in a range B above a temperature threshold (a shaded area in FIG. 7). The particle diameter growth start temperature T1 is set to the temperature threshold, above which the growth in the particle diameter is accelerated.

The determination in Step S301 is performed in a predetermined cycle except when the complete regeneration of the DPF 33 is performed in Step S304 (explained after).

If the DPF temperature T does not exceed the particle diameter growth start temperature T1 and the result of the determination in Step S301 is "NO", the determination in Step S301 is repeated.

If the DPF temperature T exceeds the particle diameter growth start temperature T1 and the result of the determination in Step S301 is "YES", the processing proceeds to Step S302. In Step S302, an integrated period S is renewed by adding a predetermined period to the integrated period S. The added period is the predetermined cycle, in which the determination in Step S301 is performed.

Then, in Step S303, it is determined whether the integrated period S is longer than a limit integrated period S1. The limit integrated period S1 is a predetermined reference period, at which the progress of the growth in the ash particle diameter reaches an upper limit, below which the ashes can be discharged smoothly by regenerating the DPF 33. The limit integrated period S1 is obtained through experimentation and the like in advance.

If the result of the determination in Step S303 is "NO", the processing returns to Step S301.

If the result of the determination in Step S303 is "YES", the processing proceeds to Step S304 and the complete regeneration of the DPF 33 is performed. If the complete regeneration of the DPF 33 is finished, the integrated period S is reset (S=0) in Step S305.

The reference temperature, with which the DPF temperature T is compared in Step S301, is set at the particle diameter growth start temperature T1. Therefore, the integrated period S is calculated by integrating the periods in which the growth in the ash particle diameter progresses. Therefore, the integrated period S can suitably correspond to the ash particle diameter D. The progress of the growth in the ash particle diameter D can be easily estimated from the integrated period S.

(Third Embodiment)

Figure 8:
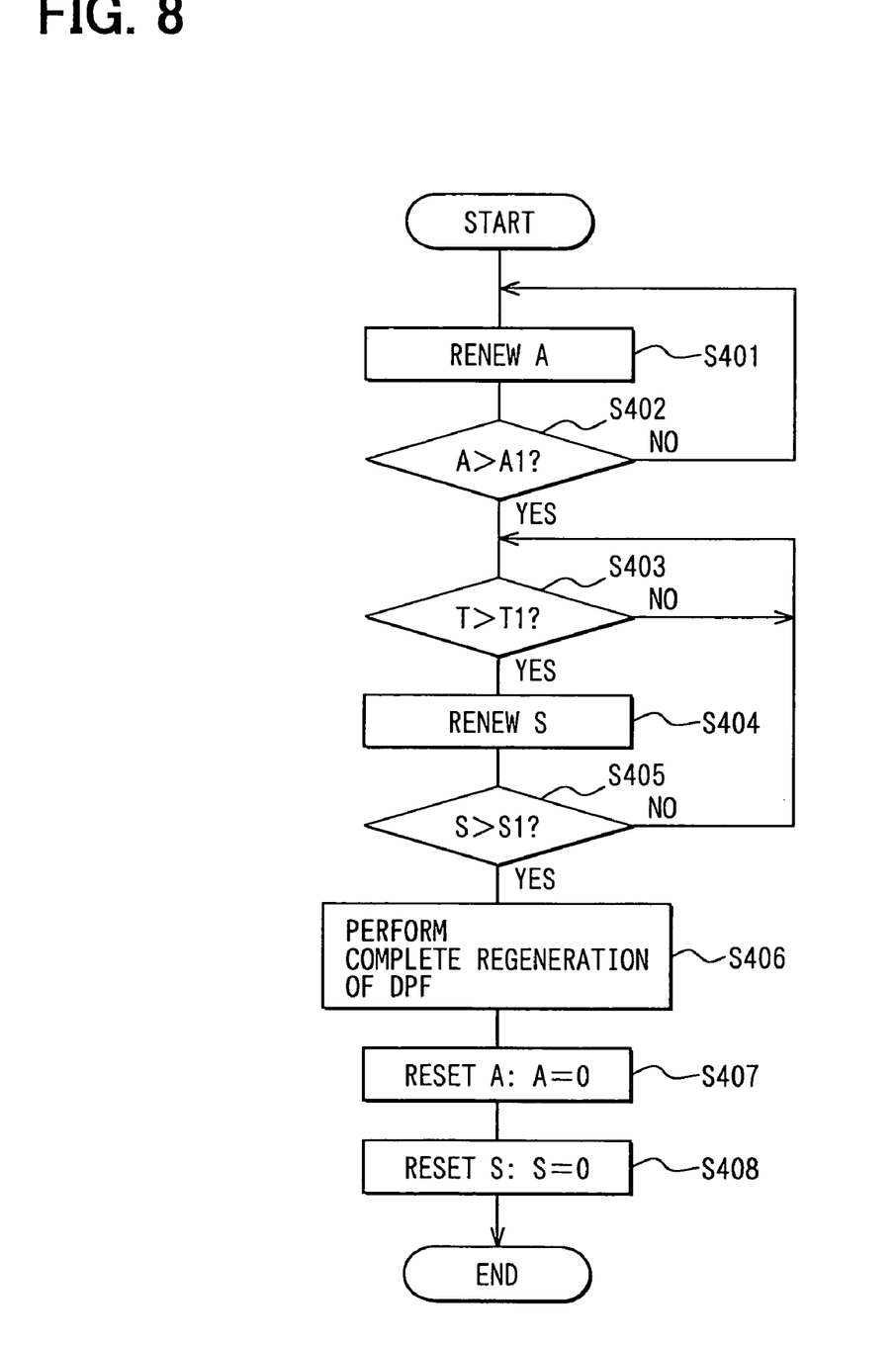
FIG. 8 is a flowchart showing regeneration control of a particulate filter performed by an ECU of an exhaust gas purification system according to a third embodiment of the present invention.

Next, control performed by an ECU 8 of an exhaust gas purification system according to a third embodiment of the present invention will be explained based on a flowchart shown in FIG. 8. The determination of the regeneration start timing of the DPF 33, which is performed by the ECU 8 based on the progress of the growth in the ash particle diameter, is different from that of the second embodiment.

Figure 9:
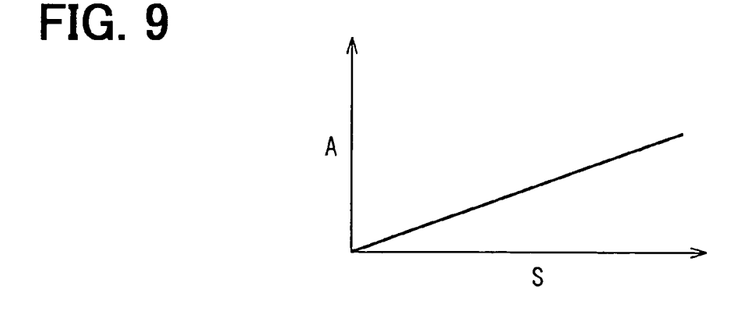
FIG. 9 is a graph showing a relationship between a quantity of accumulated ashes and duration of operation of the engine 1 according to the third embodiment.

First, in Step S401, an ash estimation accumulation quantity A is renewed. The ash estimation accumulation quantity A is an estimate of the quantity of the ashes, which are generated after the end of the previous complete regeneration of the DPF 33, and enter the DPF 33. For instance, a total operation amount of the engine 1 such as a total travel distance after the end of the previous complete regeneration of the DPF 33 or a total fuel injection quantity after the end of the previous complete regeneration of the DPF 33 can be employed as an index of the ash estimation accumulation quantity A. In the case where the total travel distance after the end of the previous complete regeneration of the DPF 33 is employed as the index, the total travel distance of the vehicle at the time when the previous complete regeneration of the DPF 33 is finished is stored, and a difference between the stored total travel distance and a present total travel distance is calculated. For instance, the total travel distance corresponding to the data indicated by a trip meter can be employed. In the case where the total fuel injection quantity is employed as the index, command values of the fuel injection quantity after the end of the previous complete regeneration of the DPF 33 are integrated. As an elapsed period S of the operation increases, the total travel distance or the total fuel injection quantity increases and the quantity A of the generated ashes increases as shown in FIG. 9.

Alternatively, the quantity of the ashes generated per unit time may be calculated based on the operating state of the engine 1, and the quantity may be integrated.

When a light load is applied to the engine 1, an air intake pressure decreases and a quantity of the engine oil ascending into the cylinders of the engine 1 increases. Therefore, the ashes are easily generated when the light load is applied to the engine 1. When a heavy load is applied to the engine 1, the air is highly supercharged, and a quantity of the oil leaking from the supercharger 4 is increased. Therefore, the ashes are easily generated when the heavy load is applied to the engine 1. The degree of the applied load can be determined based on the accelerator position or the engine rotation speed. Moreover, as the engine rotation speed increases, the air intake quantity increases and the quantity of the oil entering the cylinder with blow-by gas increases. Therefore, the more ashes are generated as the engine rotation speed increases. A map, in which the quantity of the ashes generated per unit time corresponds to the accelerator position or the engine rotation speed, is prepared through experimentation in advance and is stored in the ECU 8. The quantity of the ashes generated per unit time is calculated in reference to the map. Other than the accelerator position or the engine rotation speed, any state quantities defining the operating state and the quantity of the ashes generated per unit time can be employed as parameters of the map for calculating the quantity of the ashes generated per unit time.

In Step S402, it is determined whether the ash estimation accumulation quantity A is greater than a limit ash accumulation quantity A1. The limit ash accumulation quantity A1 is an ash accumulation quantity at which the growth in the ash particle diameter starts. The ash particle diameter grows if multiple dispersed ash particles aggregate. Therefore, the ash particles do not aggregate unless density of the accumulated ashes increases to a certain degree. The limit ash accumulation quantity A1 is defined based on this fact. If the ash estimation accumulation quantity A does not exceed the limit ash accumulation quantity A1 and the result of the determination in Step S402 is "NO", the processing returns to Step S401. Step S401 for renewing the ash estimation accumulation quantity A is performed in a predetermined cycle.

If the ash estimation accumulation quantity A exceeds the limit ash accumulation quantity A1 and the result of the determination in Step S402 is "YES", the processing proceeds to Step S403. Processing performed in steps from Step S403 to Step S405 is similar to the processing performed in the steps from Step S301 to Step S303 of the second embodiment. More specifically, the integrated period S is calculated, and the complete regeneration of the DPF 33 is performed in Step S406 if the integrated period S exceeds the limit integrated period S1.

After the complete regeneration of the DPF 33 is finished, the ash estimation accumulation quantity A is reset (A=0) in following Step S407. Then, the integrated period S is reset (S=0) in Step S408.

In the exhaust gas purification system of the present embodiment, even if the state in which the DPF temperature T exceeds the particle diameter growth start temperature T1 continues for a long time, the processing in Step S403 and the following steps is not performed unless the ash estimation accumulation quantity A exceeds the limit ash accumulation quantity A1 and the determination in Step S402 is affirmatively determined. Therefore, if the ash estimation accumulation quantity A does not exceed the limit ash accumulation quantity A1, it is determined that the growth in the ash particle diameter has not started. The calculation of the integrated value of the periods, in which the DPF temperature T is higher than the particle diameter growth start temperature T1, is started after the accumulation of the ashes progresses to some extent and a condition, under which the growth in the particle diameter starts, is established. Therefore, the progress of the growth in the particle diameter can be grasped more precisely.

(Fourth Embodiment)

Next, control performed by an ECU 8 of an exhaust gas purification system according to a fourth embodiment of the present invention will be explained based on a flowchart shown in FIG. 10. The determination of the regeneration start timing of the DPF 33, which is performed by the ECU 8 based on the progress of the growth in the ash particle diameter, is different from that of the second embodiment.

Figure 10:
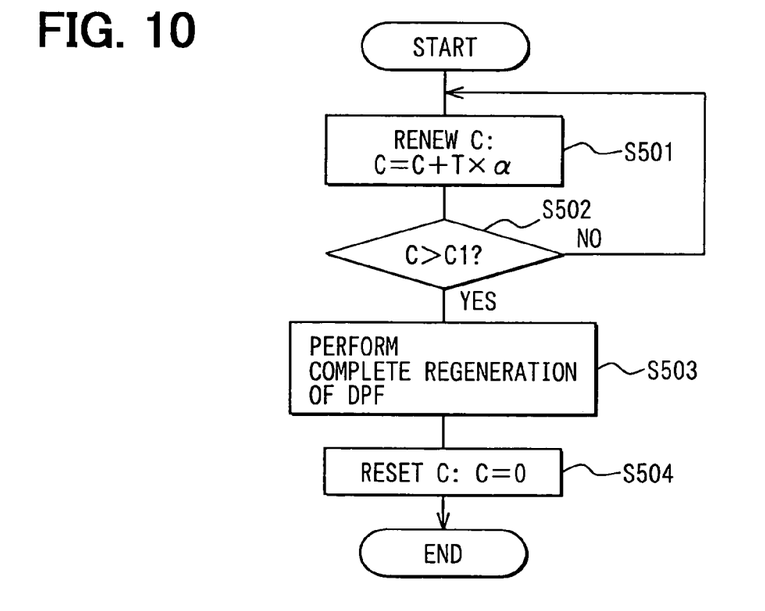
FIG. 10 is a flowchart showing regeneration control of a particulate filter performed by an ECU of an exhaust gas purification system according to a fourth embodiment of the present invention.
Figure 11:
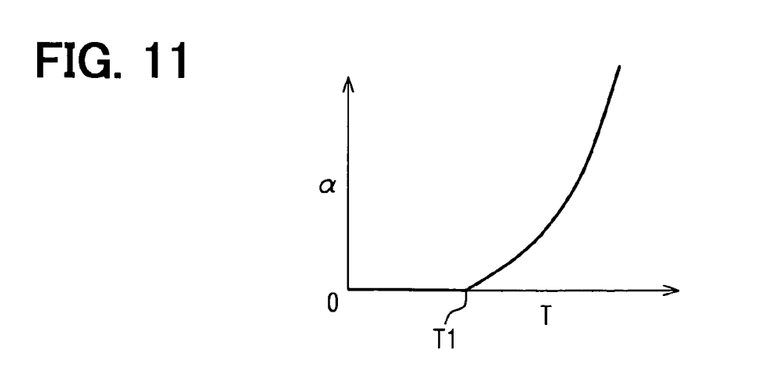
FIG. 11 a graph showing a relationship between a weight and temperature of the particulate filter of the exhaust gas purification system according to the fourth embodiment.

First, in Step S501 of the flowchart shown in FIG. 10, a temperature state variable representing the progress of the growth in the ash particle diameter per unit time is calculated. Meanwhile, in Step S501, an integrated value C is renewed by adding the temperature state variable to the integrated value C. The temperature state variable quantitatively indicates whether an environment for promoting the growth in the ash particle diameter is established. The temperature state variable is calculated by multiplying the DPF temperature T by a weight $\alpha$. As shown in FIG. 11, the weight $\alpha$ is zero until the DPF temperature T increases to the particle diameter growth start temperature T1. If the DPF temperature T exceeds the particle diameter growth start temperature T1, the weight $\alpha$ is increased as the DPF temperature T increases. It is because the ash particles easily aggregate under the high temperature, and the growth in the particle diameter is promoted under the high temperature. The ECU 8 stores a relationship between the DPF temperature T and the weight $\alpha$ shown in FIG. 11 in the form of a map and determines the value of the weight $\alpha$ in reference to the map.

Then, in Step S502, it is determined whether the integrated value C is greater than a limit weight integrated value C1. The limit weight integrated value C1 is a predetermined reference value of the integrated value C. When the integrated value C reaches the limit weight integrated value C1, the progress of the growth in the ash particle diameter reaches an upper limit, below which the ashes can be smoothly discharged from the DPF 33 during the regeneration. The limit weight integrated value C1 is obtained through experimentation and the like in advance.

If the result of the determination in Step S502 is "NO", the processing returns to Step S501.

If the result of the determination in Step S502 is "YES", the processing proceeds to Step S503 and the complete regeneration of the DPF 33 is performed. If the complete regeneration of the DPF 33 is finished, the integrated value C is reset (C=0) in Step S504.

The temperature state variable (T×$\alpha$) quantitatively indicates whether the environment promoting the growth of the ash particle diameter is established or not, as explained above. The temperature state variable suitably corresponds to the growth in the particle diameter per unit time. Therefore, the progress of the growth in the ash particle diameter can be grasped precisely even if the DPF temperature varies in accordance with the operating state of the engine 1 and the speed of the growth in the particle diameter varies.

(Fifth Embodiment)

Next, control performed by an ECU 8 of an exhaust gas purification system according to a fifth embodiment of the present invention will be explained based on a flowchart shown in FIG. 12. The determination of the regeneration start timing of the DPF 33, which is performed by the ECU 8 based on the progress of the growth in the ash particle diameter, is different from that of the third embodiment.

Figure 12:
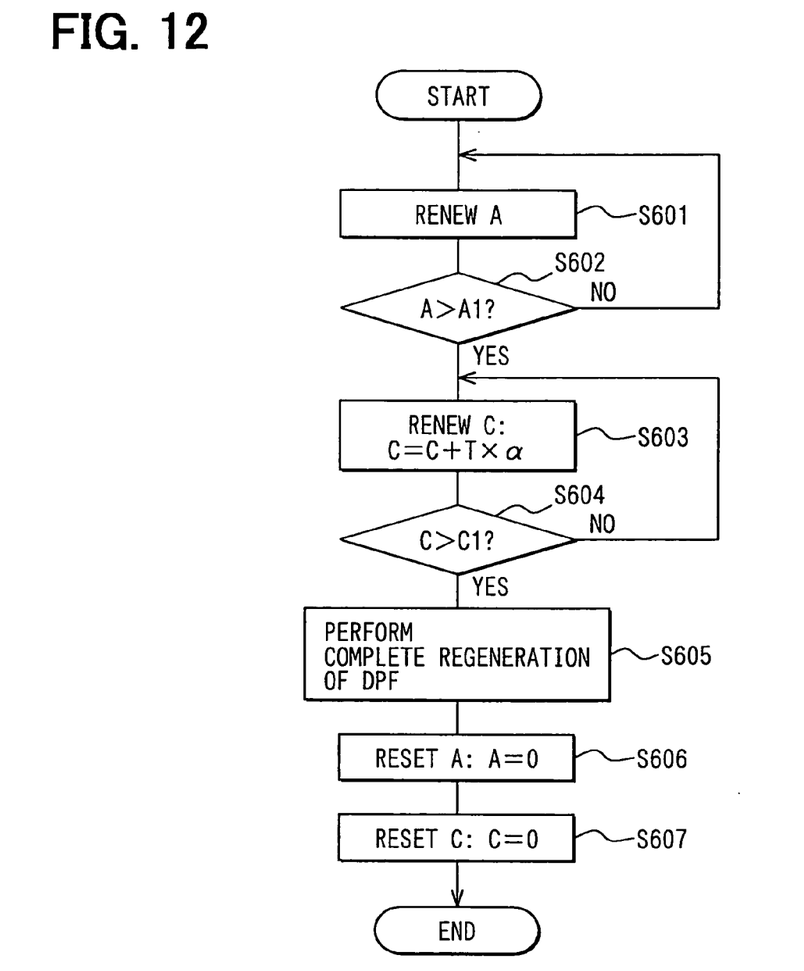
FIG. 12 is a flowchart showing regeneration control of a particulate filter performed by an ECU of an exhaust gas purification system according to a fifth embodiment of the present invention.

Processing performed in Step S601 and Step S602 of the flowchart shown in FIG. 12 is similar to the processing performed in Step S401 and Step S402 of the third embodiment. More specifically, the ash estimation accumulation quantity A is compared with the limit ash accumulation quantity A1. The processing in steps following Step S602 is not performed unless the ash estimation accumulation quantity A exceeds the limit ash accumulation quantity A1. Processing performed in Step S603 and S604 is similar to the processing performed in Step S501 and Step S502 of the fourth embodiment. More specifically, the integrated value C of the temperature state variable (T×α) is calculated. If the integrated value C exceeds the limit weight integrated value C1, the complete regeneration of the DPF 33 is performed in Step S605. If the complete regeneration of the DPF 33 is finished, the ash estimation accumulation quantity A is reset (A=0) in Step S606 and the integrated value C is reset (C=0) in Step S607.

Thus, the start timing of the complete regeneration of the DPF 33 is determined by integrating the temperature state variable (T×α). Also in this case, the temperature state variable (T×α) is integrated after the accumulation of the ashes progresses to some extent and a condition, under which the growth of the particle diameter starts, is established. Therefore, the progress of the growth in the ash particle diameter can be grasped further precisely.

Figure 13:
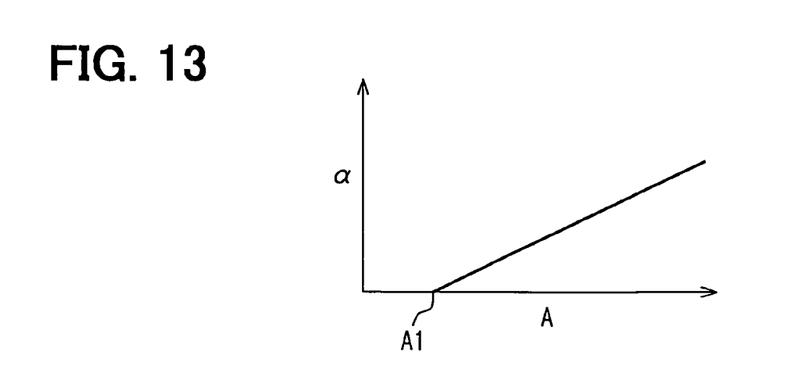
FIG. 13 is a graph showing a relationship between a weight and a quantity of ashes accumulated in a particulate filter according to the fifth embodiment.

An effect equivalent to the effect of the flowchart shown in FIG. 12 can be obtained even if Steps S601, S602 are omitted and the α is calculated from a two-dimensional map between the DPF temperature T and the ash estimation accumulation quantity A, in which the α is zero if the ash estimation accumulation quantity A is less than the limit ash accumulation quantity A1 as shown in FIG. 13. In this case, if the map provides the greater α as the ash estimation accumulation quantity A increases in the range where the ash estimation accumulation quantity A is greater than the limit ash accumulation quantity A1, the progress of the growth in the ash particle diameter can be grasped further precisely. It is because the growth in the ash particle diameter is caused by the aggregation of the ash particles and is promoted further as the quantity of the accumulated ashes increases, even if the DPF temperature is the same.

During the regeneration of the DPF 33, the ashes staying in the DPF 33 are constantly exposed to the high temperature. Therefore, an environment for promoting the growth in the ash particle diameter is established. Therefore, the limit integrated period S1 or the limit weight integrated value C1 for determining the timing of the regeneration of the DPF 33 should be preferably set in anticipation of the growth in the particle diameter during the regeneration of the DPF 33. In this case, the limit integrated period S1 or the limit weight integrated value C1 may be varied in accordance with the PM accumulation quantity m at that time so that the limit integrated period S1 or the limit weight integrated value C1 decreases as the PM accumulation quantity m increases.

In the above embodiments, the determination of regeneration start timing based on the PM accumulation quantity m is also performed. In some required specifications, the regeneration start timing of the DPF 33 may be determined based on the progress of the growth in the ash particle diameter alone.

The present invention should not be limited to the disclosed embodiments, but may be implemented in many other ways without departing from the spirit of the invention.

What is claimed is:

1. An exhaust gas purification method for an internal combustion engine having a particulate filer which is disposed in an exhaust passage of the engine for collecting combustible particulate matter included in exhaust gas and which is regenerated by combusting such combustible particulate matter collected and accumulated in the particulate filter, the exhaust gas purification method comprising:

estimating progress of growth in diameter of incombustible ash particles included in the exhaust gas, wherein the incombustible ash particles are not combusted by regeneration of the particulate filter; and determining that a regeneration start time for the particulate filter is reached if an estimated value of ash particle diameter estimated by the growth estimating means exceeds a predetermined value.

2. An exhaust gas purification system for an internal combustion engine, said system comprising:

a particulate filter disposed in an exhaust passage of the engine for collecting combustible particulate matter included in exhaust gas, wherein the particulate filter is regenerated by combusting such combustible particulate matter collected and accumulated in the particulate filter;

a growth estimator estimating progress of growth in diameter of incombustible ash particles included in the exhaust gas, wherein the incombustible ash is not combusted by regeneration of the particulate filter; and a regeneration timing determining unit determining that regeneration start timing of the particulate filter is reached if an estimated value of ash particle diameter estimated by the growth estimating means exceeds a predetermined value.

3. An exhaust gas purification system for an internal combustion engine having a particulate filter, which system is disposed in an exhaust passage of the engine for collecting particulate exhaust gas matter and which is regenerated by combusting particulate matter collected and accumulated in the particulate filter, the exhaust gas purification system comprising:

growth estimating means for estimating progress of growth in diameter of incombustible ash particles included in the exhaust gas wherein the incombustible ash particles are not combusted by regeneration of the particulate filter; and regeneration timing determining means for determining that a time to start regeneration of the particulate filter has been reached if an estimated value of ash particle diameter estimated by the growth estimating means exceeds a predetermined value.

4. The exhaust gas purification system as in claim 3, further comprising:

first quantity estimating means for estimating a quantity of combustible particulate matter accumulated in the particulate filter, wherein the regeneration timing determining means determines to start regeneration of the particulate filter if the quantity of accumulated combustible particulate matter which is estimated by the first quantity estimating means exceeds a predetermined reference value.

5. The exhaust gas purification system as in claim 3, further comprising:
second quantity estimating means for estimating a quantity of incombustible ash accumulated in the particulate filter, wherein
the growth estimating means estimates that growth in incombustible ash particle diameter has not started if the estimated value of the quantity of accumulated ash is equal to or less than a predetermined reference value.

6. The exhaust gas purification system as in claim 5, wherein
the second quantity estimating means estimates that the quantity of accumulated ash is increased as total operation amount or total fuel consumption of the engine after a previous regeneration of the particulate filter increases.

7. The exhaust gas purification system as in claim 5, wherein
the second quantity estimating means calculates a quantity of ash generated per unit time based on an operating state of the engine and integrates the calculated quantity of ash generated per unit time after a previous regeneration of the particulate filter, and
the second quantity estimating means estimates the quantity of accumulated ash based on the integrated value of the quantity of generated ash.

8. The exhaust gas purification system as in claim 3, wherein:
the growth estimating means estimates that growth in incombustible ash particle diameter progresses further as temperature of the particulate filter increases and as elapsed time since a previous regeneration of the particulate filter lengthens.

9. The exhaust gas purification system as in claim 8, wherein:
the growth estimating means includes temperature determining means for determining whether particulate filter temperature is higher than a predetermined reference temperature, and period integrating means for calculating an integrated value for periods in which the temperature determining means determines that particulate filter temperature is higher than the reference temperature, after the end of a previous particulate filter regeneration, the growth estimating means estimates that growth in ash diameter progresses further as the integrated value calculated by the period integrating means lengthens, and the regeneration timing determining means determines whether to start regeneration or not based on whether the integrated value is greater than a predetermined reference value or not.

10. The exhaust gas purification system as in claim 8, wherein
the growth estimating means includes progress calculating means for calculating the degree of progress of growth in incombustible ash particle diameter per unit time based on particulate filter temperature and progress integrating means for calculating an integrated value of the degree of progress of growth in incombustible ash particle diameter by integrating the degree of progress per unit time after a previous regeneration of the particulate filter, the growth estimating means estimates that growth in incombustible ash particle diameter progresses further as the integrated value of the degree of progress calculated by the progress integrating means increases, and the regeneration timing determining means determines whether to start regeneration or not based on whether the integrated value of the degree of progress is greater than a predetermined reference value or not.

11. The exhaust gas purification system as in claim 10, wherein
the progress calculating means calculates the degree of progress per unit time by multiplying the particulate filter temperature with a weight, and the progress calculating means sets the weight so that the weight is zero if of the particulate filter temperature is equal to or lower than a predetermined reference temperature and the weight is increased in accordance with the particulate filter temperature if the temperature of the particulate filter exceeds the reference temperature.

* * * * *